No. 719,605.  
M. NEIL.  
HEDGE FENCE.  
APPLICATION FILED MAR. 10, 1902.  
NO MODEL.  
PATENTED FEB. 3, 1903.
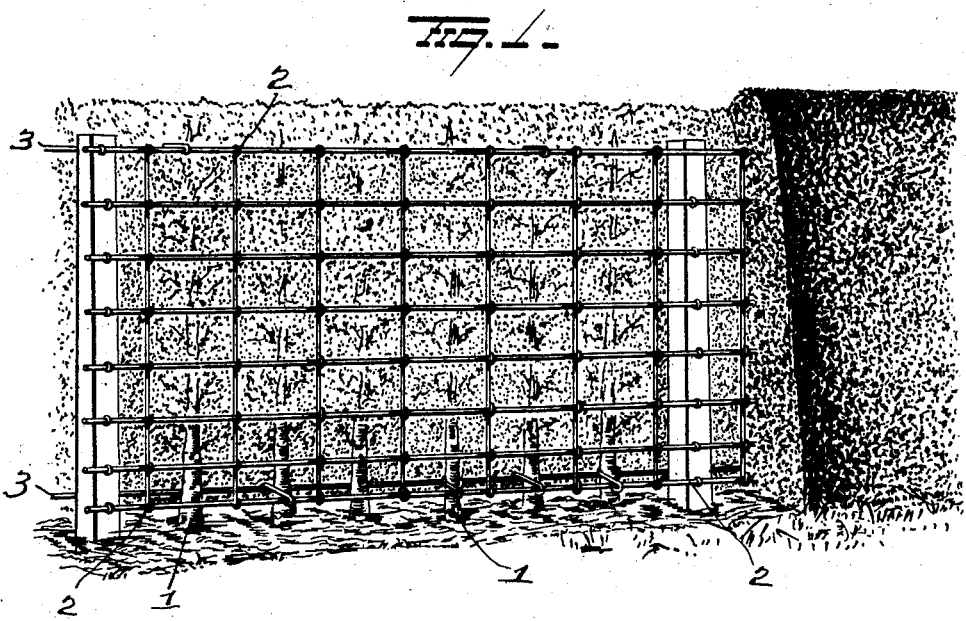
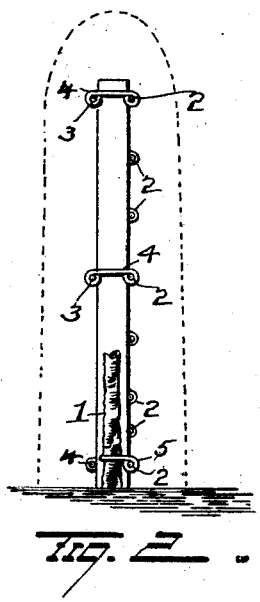
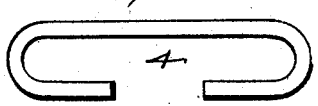
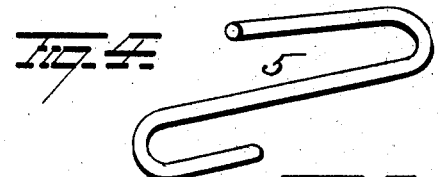
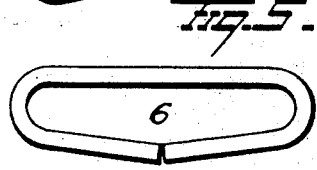
WITNESSES  
INVENTOR  
M. Neil  
Attorney

UNITED STATES PATENT OFFICE.

MICHAEL NEIL, OF DAYTON, OHIO.

HEDGE FENCE.

SPECIFICATION forming part of Letters Patent No. 719,605, dated February 3, 1903.

Application filed March 10, 1902. Serial No. 97,554. (No model.)

*To all whom it may concern:*

Be it known that I, MICHAEL NEIL, a resident of Dayton, in the county of Montgomery and State of Ohio, have invented certain new and useful Improvements in Hedge Fences; and I do hereby declare the following to be a full, clear, and exact description of the invention, such as will enable others skilled in the art to which it appertains to make and use the same.

My invention relates to an improved hedge fence, the object of the invention being to so support the hedge-canes between a woven wire and longitudinal wires and so connect the woven wire and individual wires together and to the canes as to insure a strong and durable as well as an even fence and not injure the canes in the slightest, and, further, to improve the hedge fence disclosed in Patent No. 591,874, granted to me October 19, 1897, for a hedge fence.

With these objects in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a view in section, and Figs. 3, 4, and 5 are views of various forms of devices for hooking the woven wires and individual wires together and the former to the hedge-canes.

1 represents a line of hedge-canes grown in the usual manner, with the branches partly or wholly removed. Posts are driven into the ground or otherwise supported in line with the canes, to which a woven wire 2 is secured and drawn taut against one side of the line of canes, and on the opposite side of the canes wires 3 are drawn taut and secured to the posts above mentioned. If, however, the canes are sufficiently grown to support the netting 2 and wires 3, the employment of posts driven in the ground may be dispensed with. The longitudinal wires 3 are connected at intervals and between the canes with the woven wire 2 by double hooks or links 4, as clearly shown in Fig. 2, a detail view of the hook being illustrated in Fig. 3, in which view the hook is shown as comprising a single piece of strong wire bent at both ends into hook shape, one hooked end to receive a strand of the woven wire and the other to receive a longitudinal wire 3, when the hooked ends are bent to close the hooks and prevent possibility of the escape of either wires 3 or woven wire 2. In practice I preferably employ a suitable tool to quickly bend the hooked ends of hooks 4, and thus greatly expedite the construction of the fence. The lower selvage-wire of the woven wire is connected to the canes by hooks 5, as clearly shown in Figs. 1 and 2, and a detail of the hook is illustrated in Fig. 4. These hooks 5 each comprise a piece of strong wire bent at one end, forming a comparatively large horizontally-disposed hook or loop to receive the cane and be clamped thereon near the ground and the other end of the hook bent into a smaller vertically-disposed hook to receive the lower selvage-wire of the woven wire, and when the hook is closed by a suitable tool the attachment to the canes becomes a permanent one.

While I might employ metal links 6 (shown in Fig. 5) or other forms of attachment to connect the woven wire 2 with wires 3 and with canes 1, still I prefer to employ the hooks or links 4 and 5, as they are especially adapted for the purpose.

It will be seen that with my improvements the canes are supported between the woven wire 2 and wires 3, and as the lower selvage-wire of the woven wire is connected to the canes near the ground the woven wire cannot work up nor away from the canes, as the hooks 5 are connected directly with the canes, but will not interfere in the slightest with the free growth of the hedge, and by constructing the fences as above explained it can be made a barrier to stock much earlier than any fence of this character heretofore known.

When the woven wire is applied to young hedges when the branches are small and pliable, it may not be necessary to remove the branches before applying the wire. They are then easily bent up against the canes being embraced by the wires.

Various slight changes might be resorted to in the general form and arrangement of the several parts described without departing from the spirit and scope of my invention, and hence I would have it understood that I do not limit myself to the details set forth, but consider myself at liberty to make such slight changes and alterations as fairly fall within the spirit and scope of my invention.

Having fully described my invention, what I claim as new, and desire to secure by Letters Patent, is—

1. In a fence, the combination with a line of hedge-canes, of a wire-netting arranged wholly on one side of the line of canes, a single horizontal wire located wholly on the other side of the line of canes in line with the upper edge of the netting, links located transversely between the canes and each having a hook or loop at each end, certain of said links engaging and connecting the upper edge of the netting with the said single horizontal wire, and other links connecting the canes near their base with the netting.

2. The combination with a line of canes, of a wire-netting located wholly on one side of the line of canes, a single wire located wholly on the other side of the line of canes in line with the upper edge of the netting, links connecting the single wire with the netting at points between the canes, and a series of links having hooks at their respective ends disposed at right angles to each other, one hook of each of said last-mentioned links engaging the lower edge of the netting and the other hook of each last-mentioned link engaging a cane near the base of the latter.

3. In a fence, the combination with a line of canes, of woven wire located wholly on one side of the line of canes, a horizontal wire located wholly on the other side of the line of canes and opposite from a point between the lower and upper edges of the woven wire, links connecting this horizontal wire with the woven wire at points between the canes, and a series of links having hooks at their respective ends disposed at right angles to each other, one hook of each of said last-mentioned links engaging the lower edge of the woven wire and the other hook of each last-mentioned link engaging a cane near the base of the latter.

In testimony whereof I have signed this specification in the presence of two subscribing witnesses.

MICHAEL NEIL.

Witnesses:
WM. H. NEIL,
VERNETTA SHADE.